Oct. 20, 1970 J. D. SKILDUM 3,535,576

PHOTOIONIZATION DEVICE WITH ELECTRODES ATTACHED TO EXTERIOR OF ENVELOPE

Filed Nov. 21, 1968

INVENTOR.

JOHN D. SKILDUM

BY Robert O. Vidas

United States Patent Office 3,535,576

Patented Oct. 20, 1970

3,535,576

PHOTOIONIZATION DEVICE WITH ELECTRODES ATTACHED TO EXTERIOR OF ENVELOPE

John D. Skildum, St. Paul, Minn., assignor to Honeywell Inc., Minneapolis, Minn., a corporation of Delaware Filed Nov. 21, 1968, Ser. No. 777,846
Int. Cl. H01j *61/40;* H01k *1/26*
U.S. Cl. 313—112 4 Claims

ABSTRACT OF THE DISCLOSURE

A photoionization device suitable for operation in the ordinary atmosphere including a window material transparent to vacuum ultraviolet radiation and having interdigited electrodes deposited on the surface thereof for collection of ions from photoionized gases.

BACKGROUND OF THE INVENTION

The present invention is directed to gas detectors and is more specifically directed to gas detectors of the photoionization type. In this type of a detector the gas to be analyzed is subjected to light of a wavelength such as to produce ionization of at least the species being sought. For example if one were attempting to determine the presence of a gas such as nitrobenzene in a gas mixture one would utilize ultraviolet light of about 1215 angstroms (A.) in wavelength, a wavelength which has an energy of about 10.2 electron volts (ev.). This level of energy is adequate to produce ionization of nitrobenzene. The general principles of photoionization for gas detection are well known and will not be discussed with any great detail here.

One of the severe drawbacks involved in photoionization gas detectors is the fact that the energy level necessary to produce ionization of the gases to be determined occurs only at the vacuum ultraviolet wavelengths of light. These wavelengths generally encompass the range of about 1000 to 2000 A. While such wavelengths are not difficult to produce, the difficulty that arises is that they are very strongly absorbed by air. At ordinary atmospheric pressure the vacuum ultraviolet radiation will only penetrate from the source into the air atmosphere a distance of less than 0.2 mm. The strong attenuation of the vacuum ultraviolet radiation by air makes it very difficult to produce the desired ionization of the specie being sought and makes the collection of any specie which have ionized somewhat of a problem in view of the fact that the ionization takes place so close to the source of the vacuum ultraviolet.

In most of the discussions that are found in the prior art relating to the use of photoionization gas detectors the previous experimenters have utilized either chromatographic techniques to separate the specie being sought so as to present a controlled atmosphere containing the unknown or they have utilized reduced pressure environments to overcome the problem of attenuation of the vacuum ultraviolet radiation by the atmosphere in which the unknown is contained.

BRIEF SUMMARY OF THE INVENTION

In the present invention the problems of the attenuation of vacuum ultraviolet radiation by air are largely overcome due to the close proximity of the collecting electrodes to the source of the vacuum ultraviolet. In the invention a window of a material that is transparent to vacuum ultraviolet radiation of the desired wavelengths is used. This window, which may be calcium fluoride, has coated immediately on a portion of its surface metal to act as the electrodes for collecting of the specie ionized by the vacuum ultraviolet. Thus, as the vacuum ultraviolet penetrates the window and produces ionization of the specie (such as a nitrobenzene noted above) the collecting electrodes are proximate to the ionized specie and can readily collect it thereby producing a larger signal than if one were to attempt to collect the specie by electrodes more remotely arranged. In the preferred embodiment of the invention use is made of vacuum metalized aluminum or platinum as the electrode material. This material permits the vacuum ultraviolet radiation to pass through the aluminum and enhances the total area in which ionization of the gas specie can take place without diminishing the collector efficiency of the electrodes.

DESCRIPTION OF THE PREFERRED EMBODIMENT

Figure 1:
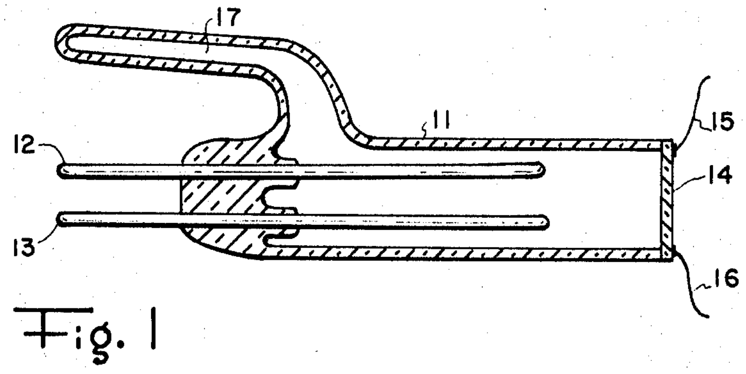
FIG. 1 is a cross-sectional view of a photoionization detector tube incorporating the electrode-window arrangement in accordance with the present invention.

Turning to FIG. 1 there is illustrated in cross-sectional form a photoionization gas detector tube in accordance with the present invention. The tube 11 may be made of a material such as glass which permits ready forming and introduction of leads in a hermetic manner. A suitable glass for the purpose is Corning 7052. Hermetically sealed into one end of the glass are electrode members 12 and 13 which may be of about .080 inch diameter and about 2 inches in length. The material of the electrode members is conveniently either tungsten or Kovar, both of which readily provide hermetic glass-to-metal seals although other material may also be used. Across one end of tube 11 is a window material 14 which is transparent to the vacuum ultraviolet radiation that is used in the ionization of the specie of gas to be determined. A number of materials are readily available that are suitable for such purposes. For example, and without limitation, one may use lithium fluoride, magnesium fluoride, calcium fluoride, strontium fluoride, barium fluoride, and the sapphire form of aluminum oxide. By judicious selection of a window material one may enhance the selectivity of the detector as the window material may be used to act as a partial filter. For example, if xenon is the fill gas in tube 11 two lines are produced—one at 1360 A. the other at 1500 A. With a sapphire window only the 1500 A. line is passed. Alternatively, if one uses a $CaF_2$ window the 1360 A. line is passed.

Extending away from the surface of window 14 are leads 15 and 16 which will be explained in further detail with regard to FIG. 2 wherein similar members are given similar numerical designation. The tube also has a gas introduction means such as extension 17 which is a tubulation that has been sealed after first evacuating the chamber defined by window 14 and envelope 11 and then backfilling with some suitable gas. The gases which will be used to backfill will normally be at a pressure lower than atmosphere and typically would be of argon, nitrogen, hydrogen, krypton, oxygen or xenon. The gas pressure within the envelope is normally below atmospheric and may suitably be about 7 torr. If the pressure is below about 7 torr atomic line spectra is produced while if above 20 torr a continuum spectra results. Window member 14 can be suitably hermetically bonded to the end of tubulation 11 in various ways. One such way is the use of an epoxy adhesive which gives both a strong as well as a hermetic type bond.

Figure 2:
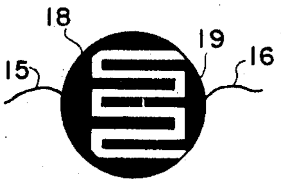
FIG. 2 is an end view of the vacuum ultraviolet radiation transparent portion of the tube of FIG. 1 showing the interdigited leads on the electrode-window arrangement.

Turning now to FIG. 2 there is illustrated a face-on view of window member 14 showing the interdigiting of electrode members 18 and 19. The electrode members may be formed on the outer surface of member 14 by a variety of techniques. One such technique is to use a silk screen type technique. The appropriate pattern that is desired is produced in the silk screen and a conductive paste such as a platinum paste supplied by Englehard Industries of Newark, N.J., under their designation No. 5801 is used to produce the pattern on window 14. Alternatively one may vacuum deposit materials through appropriate masks to produce the same type of pattern. Through the vacuum deposition type technique may more readily control thickness in extremely thin films. For example, the performance of the device can be enhanced if one utilizes aluminum as the electrode material and deposits it in thicknesses below 300 A. Aluminum and platinum in such thicknesses are adequately conductive for the purposes of the electrodes, but are thin enough to be transparent to the vacuum ultraviolet radiation arising from within the detector tube. Up to about 2000 A. thicknesses significant transmission of vacuum ultraviolet radiation takes place. As aluminum and platinum have low work functions they will not emit spurious electrons that would interfere with operation of the detector and yet will permit a greater quantity of the vacuum ultraviolet radiation to impinge upon the atmosphere being examined for the presence of the ionizable gases.

Figure 3:
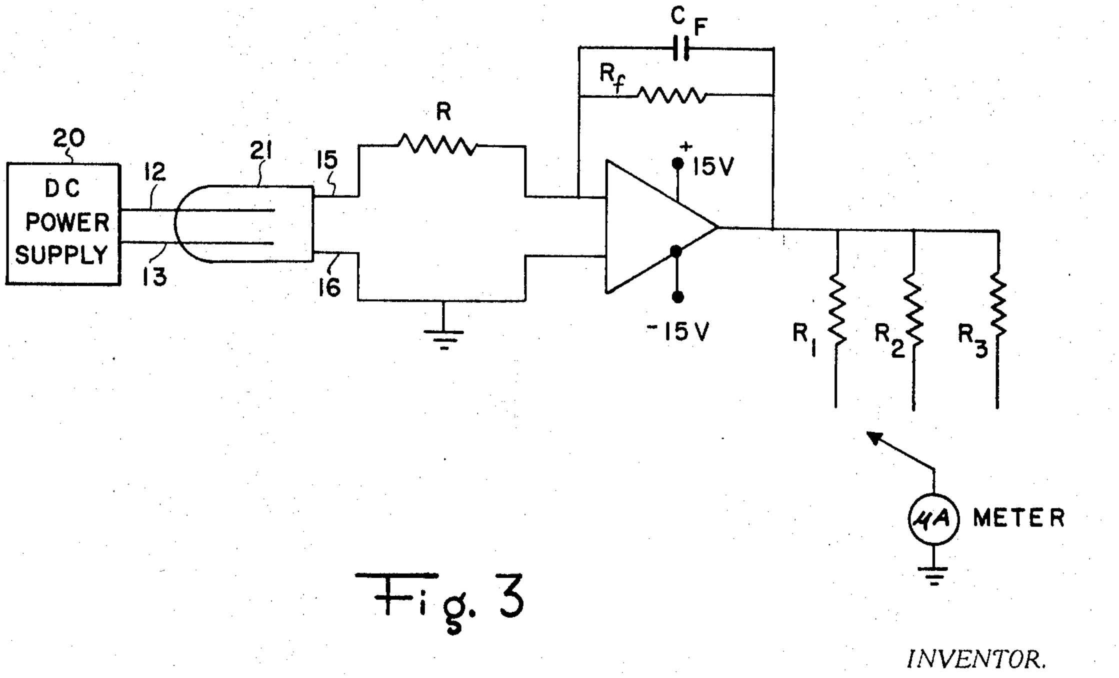
FIG. 3 is a schematic illustration of a circuit utilizing the tube of FIGS. 1 and 2.

In FIG. 3 there is shown a schematic diagram of a circuit for operation of the detector in accordance with the present invention. A source of power desingated as DC power is generally indicated at 20. While DC is preferred as a source of power AC current can be used. The voltage required for the vacuum ultraviolet source will depend upon the gas fill. For an oxygen fill a voltage of about 300 v. is required, while for a krypton fill about 500 v. is needed. This power supply is connected to electrodes 12 and 13, the discharge electrodes that produce the vacuum ultraviolet radiation within the tube generally indicated as 21. The output leads 15 and 16 are connected through a resistor to a operational amplifier which may conveniently be a Blake type A unit. A resistor identified R is included between the terminals to shield the operational amplifier from possible damage if arcing should occur across the electrode members 18 and 19. The output of the operational amplifier is directed through a series of resistors identified R1, R2 and R3 to a microammeter for readout. As the output of the detector will vary over broad ranges, a series of varying resistors is utilized to increase the sensitivity of the meter to the particular operating current level. Alternatively, one may utilize the output of the amplifier in suitable alarm circuits in place of a meter reading.

The embodiments of the invention in which an exclusive property or right is claimed are defined as follows:

1. A photo-ionization device comprising:

(a) a source of ultra-violet radiation of wavelengths from about 1,000 angstroms to about 2,000 angstroms, (b) an envelope surrounding said source and having an opening, (c) an ultra-violet transparent material in said opening and sealed to said envelope, and (d) spaced planar electrodes attached to the exterior surface of said ultra-violet transparent material.

2. A device in accordance with claim 1 wherein the electrodes are of a metal selected from a group consisting of aluminum and platinum.

3. A device in accordance with claim 2 wherein the electrodes are less than 300 A. in thickness.

4. A device in accordance with claim 2 wherein the electrodes are arranged in an interdigited pattern.

References Cited

UNITED STATES PATENTS

| | | | |
|---|---|---|---|
| 2,990,491 | 6/1961 | Hendee et al. | 313—112 X |
| 3,134,898 | 5/1964 | Burnell et al. | 250—83.6 X |
| 3,446,964 | 5/1969 | Sternberg | 250—43.5 X |
| 3,454,828 | 7/1969 | Mikiya Yamane | 250—43.5 X |

JAMES W. LAWRENCE, Primary Examiner

DAVID O'REILLY, Assistant Examiner

U.S. Cl. X.R.

250—43.5; 313—201, 234